(12) United States Patent
Fowler et al.

(10) Patent No.: US 12,174,514 B2
(45) Date of Patent: Dec. 24, 2024

(54) OPTOELECTRONIC TRANSMITTER WITH PHASED ARRAY ANTENNA COMPRISING AN INTEGRATED CONTROL DEVICE

(71) Applicant: COMMISSARIAT A L'ENERGIE ATOMIQUE ET AUX ENERGIES ALTERNATIVES, Paris (FR)

(72) Inventors: Daivid Fowler, Grenoble (FR); Sylvain Guerber, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 357 days.

(21) Appl. No.: 17/787,807

(22) PCT Filed: Dec. 21, 2020

(86) PCT No.: PCT/EP2020/087385
§ 371 (c)(1),
(2) Date: Jun. 21, 2022

(87) PCT Pub. No.: WO2021/130149
PCT Pub. Date: Jul. 1, 2021

(65) Prior Publication Data
US 2023/0026564 A1    Jan. 26, 2023

(30) Foreign Application Priority Data

Dec. 23, 2019   (FR) ..................................... 1915422

(51) Int. Cl.
*G02F 1/29* (2006.01)
*G02B 6/12* (2006.01)
(Continued)

(52) U.S. Cl.
CPC ......... *G02F 1/292* (2013.01); *G02B 6/12004* (2013.01); *G02B 6/42* (2013.01);
(Continued)

(58) Field of Classification Search
CPC ..... G02F 1/2955; G02F 1/292; G02F 2203/24
See application file for complete search history.

(56) References Cited

U.S. PATENT DOCUMENTS

2017/0023736 A1\*  1/2017  Bauters ............... G02B 6/12026
2017/0371227 A1\* 12/2017  Skirlo ................... G02F 1/2955
(Continued)

FOREIGN PATENT DOCUMENTS

KR          102144632 B1 \*  8/2020
WO     WO 2018/160729 A2     9/2018

OTHER PUBLICATIONS

Machine Translation of KR-102144632-B1, Aug. 13, 2020. (Year: 2020).\*

(Continued)

*Primary Examiner* — Michelle R Connelly
(74) *Attorney, Agent, or Firm* — Oblon, McClelland, Maier & Neustadt, L.L.P.

(57) ABSTRACT

An optoelectronic emitter with a phased array antenna on a photonic chip includes a power splitter, an array of phase shifters and elementary emitters, and an integrated control device. The integrated control device includes an interferometric focusing lens, the entrance and exit faces of which are curved and define a free propagation region with a homogeneous refractive index. Input waveguides are connected to the entrance face orthogonal thereto and have an effective index for the guided modes adapted such that the optical paths of the input waveguides are identical to each other.

10 Claims, 7 Drawing Sheets

(51) Int. Cl.
G02B 6/42 (2006.01)
G02F 1/295 (2006.01)
H04B 10/61 (2013.01)

(52) U.S. Cl.
CPC ......... *G02F 1/2955* (2013.01); *H04B 10/614* (2013.01); *G02F 2203/24* (2013.01); *H04B 2210/006* (2013.01)

(56) References Cited

U.S. PATENT DOCUMENTS

| | | | |
|---|---|---|---|
| 2019/0170875 A1 | 6/2019 | Schmalenberg et al. | |
| 2021/0116655 A1* | 4/2021 | Grieco | H04B 10/11 |
| 2022/0021115 A1* | 1/2022 | Sadri | H01Q 19/062 |
| 2023/0236471 A1* | 7/2023 | Hosseini | G02F 1/292 |
| | | | 385/37 |

OTHER PUBLICATIONS

Li et al. (Preliminary Investigation of an SOI-based Arrayed Waveguide Grating Demodulation Integration Microsystem. Scientific Reports 4, 4848 (2014)). (Year: 2014).*
International Search Report and Written Opinion issued Feb. 3, 2021, in PCT/EP2020/087385 filed Dec. 21, 2020, 8 pages.
J.C. Hulme, et al. "Fully integrated hybrid silicon two dimensional beam scanner", Optics Express, vol. 23, No. 5, 2015, 14 pages.
Meint K. Smit, et al., "PHASAR-Based WDM-Devices: Principles, Design and Applications", IEEE Journal of Selected Topics in Quantum Electronics, vol. 2, No. 2, 1996, 15 pages.

* cited by examiner

OPTOELECTRONIC TRANSMITTER WITH PHASED ARRAY ANTENNA COMPRISING AN INTEGRATED CONTROL DEVICE

TECHNICAL FIELD

The field of the invention is that of on-chip photonic circuits, and, more specifically, that of optoelectronic emitters, of the phased array antenna type, produced on a photonic chip. The invention can be particularly applied in the field of LIDAR (Light Detection and Ranging).

PRIOR ART

Optoelectronic emitters with a phased array antenna (or OPA (Optical Phased Array)) are optoelectronic devices for directionally emitting a monochromatic light beam in free space. They are particularly applied in the field of laser distance detection and estimation (LIDAR), but also in the field of free-space optical communications, holographic screens and medical imaging.

FIG. 1A schematically illustrates the operating principle of such an optoelectronic emitter 1. A laser source 2 emits an optical signal that is distributed by a power splitter 3 in N arms 4 of the optoelectronic emitter 1. Each arm 4 comprises a phase shifter 5 and an elementary emitter 6, also called optical antenna. Each elementary emitter 6 emits an optical signal in free space, for example, by diffraction, with the optical signals then combining by interference in order to form a light beam. This light beam has a far field emission pattern that is particularly determined by the relative phase $\Delta\varphi$ applied by the phase shifters 5 to the optical signals propagating in the arms 4.

Such optoelectronic emitters 1 can be produced using integrated photonics, i.e., its various optical components (waveguides, power splitter, elementary emitters, etc.) are produced on and from a photonic chip.

To this end, FIG. 1B schematically and partially illustrates an example of such an optoelectronic emitter 1 produced on a photonic chip and comprising an integrated control device, as described in the article by Hulme et al., entitled *Fully integrated hybrid silicon two dimensional beam scanner*, Opt. Express 23 (5), 5861-5874 (2015).

This optoelectronic emitter 1 comprises, in addition to the laser source 2, the power splitter 3 and the array of phase shifters 5 and elementary emitters 6, a control device formed by a gradient-index lens 8A coupled to the output ends of the elementary emitters 6 at its entrance face 8A.1, and to an array of photodetectors 10 at its exit face 8A.2. The control device allows the relative phase $\Delta\varphi$ to be determined that is actually present between the optical signals propagating in the arms 4. To this end, a non-diffracted part of these optical signals is transmitted by the elementary emitters 6 to the lens 8A by input waveguides 7. The lens 8A provides an image of the far field optical radiation emitted by the optoelectronic emitter, which is then detected by the photodetectors 10. A control module 11 allows the optical far field information (in particular the angle $\Phi$ of directivity of the light beam with respect to the Y-axis in the XY plane) to be obtained and thus allows the optoelectronic emitter 1 to be calibrated.

However, the gradient-index lens is of the photonic crystal type, and is formed by a plurality of holes with different sub-wavelength diameters produced in a thin silicon film of an SOI substrate. The holes are arranged such that the effective index of the optical field has a parabolic profile along the width of the lens. However, it would appear that these holes forming the photonic crystal of the lens are particularly difficult to produce, and that any production defects significantly affect the performance capabilities of such an optoelectronic emitter.

DISCLOSURE OF THE INVENTION

The aim of the invention is to at least partly overcome the disadvantages of the prior art, and, more specifically, to propose an optoelectronic emitter with a phased array antenna on a photonic chip for which the impact of the manufacturing method on its performance capabilities is reduced or even eliminated.

To this end, the subject matter of the invention is an optoelectronic emitter with a phased array antenna on a photonic chip, comprising:
  a power splitter, intended to be coupled at the input to a laser source and intended to be coupled at the output to N waveguides forming the arms of the optoelectronic emitter, with N>1;
  an array of phase shifters and elementary emitters, disposed in the arms, the elementary emitters being laterally aligned and extending parallel to each other;
  an integrated control device comprising: input waveguides coupled to the elementary emitters; a focusing lens comprising an entrance face coupled to the input waveguides and an exit face; output waveguides coupled to the exit face; photodiodes coupled to the output waveguides; a control module adapted to control the phase shifters as a function of signals received by the photodiodes.

According to the invention, the focusing lens is an interferometric lens, the entrance and exit faces of which are curved and define a free propagation region with a homogeneous refractive index, with the exit face extending along a focal line of the focusing lens.

In addition, the input waveguides are connected to the entrance face orthogonal thereto.

Finally, an effective index for the guided modes, in a portion called correction portion of the input waveguides, is adapted such that the optical paths of the input waveguides are identical to each other.

Some preferred but non-limiting aspects of this optoelectronic emitter are as follows.

The input waveguides can each have, in the correction portion, a variation of at least one transverse dimension, with said variation of the transverse dimension being predefined for each input waveguide such that the optical paths of the input waveguides are identical to each other.

Each input waveguide can have, in the correction portion, an adiabatic variation of the width, ranging from a reference value $W_{e0}$ that is identical for each input waveguide to a maximum value $W_{ec(i)}$ that is different from one input waveguide to the next.

The optoelectronic emitter can comprise waveguides, called additional waveguides, produced with a refractive index that is different from that of the input waveguides, only extending into the correction portion, and arranged opposite and parallel to the input waveguides so as to allow modal coupling with the input waveguides, the additional waveguides each having a predetermined length such that the optical paths of the input waveguides are identical to each other.

Additional phase shifters can be coupled to said input waveguides in the correction portion, and can apply a relative phase shift between the guided modes in the input waveguides that is predefined for each of them such that the optical paths of the input waveguides are identical to each other.

The focusing lens can be a star coupler or an echelle grating.

The focusing lens can have a Rowland mounting or a confocal configuration.

The photonic chip can be produced from an SOI substrate.

The optoelectronic emitter can comprise the laser source. This laser source can be assembled on a surface, called upper surface, of the photonic chip.

BRIEF DESCRIPTION OF THE DRAWINGS

Further aspects, aims, advantages and features of the invention will become more clearly apparent upon reading the following detailed description of preferred embodiments thereof, which are provided by way of non-limiting example, and with reference to the appended drawings, in which.

DETAILED DISCLOSURE OF PARTICULAR EMBODIMENTS

In the figures, and throughout the remainder of the description, the same reference signs represent identical or similar elements. Furthermore, the various elements are not shown to scale so as to improve the clarity of the figures. Moreover, the various embodiments and alternative embodiments are not mutually exclusive and can be combined together. Unless otherwise indicated, the terms "substantially", "approximately", "of the order of" mean to the nearest 10%, and preferably to the nearest 5%. Moreover, the terms "ranging between . . . and . . . " and any equivalent terms mean that the limits are inclusive, unless otherwise stated.

The invention relates to an optoelectronic emitter with a phased array antenna comprising an integrated control device. Such an optoelectronic emitter is produced on a photonic chip. It is adapted to emit a light beam, the intensity of which has, in the far field, a determined angular distribution about a main emission axis. This angular distribution of the far field light beam emitted by the optoelectronic emitter is referred to as the 'far field emission pattern'. It thus differs from the near field emission patterns of elementary emitters (optical antennas). The far field (or Fraunhofer zone) corresponds to a distance D that is greater than the ratio of the square of a large dimension of the elementary emitter (in this case, the length $L_{ee}$ along the Z-axis) to the emission wavelength $\lambda_e$, in other words: $D > 2L_{ee}^2/\lambda_e$. The far field emission pattern in this case can be adjusted by the integrated control device.

Figure 1A:
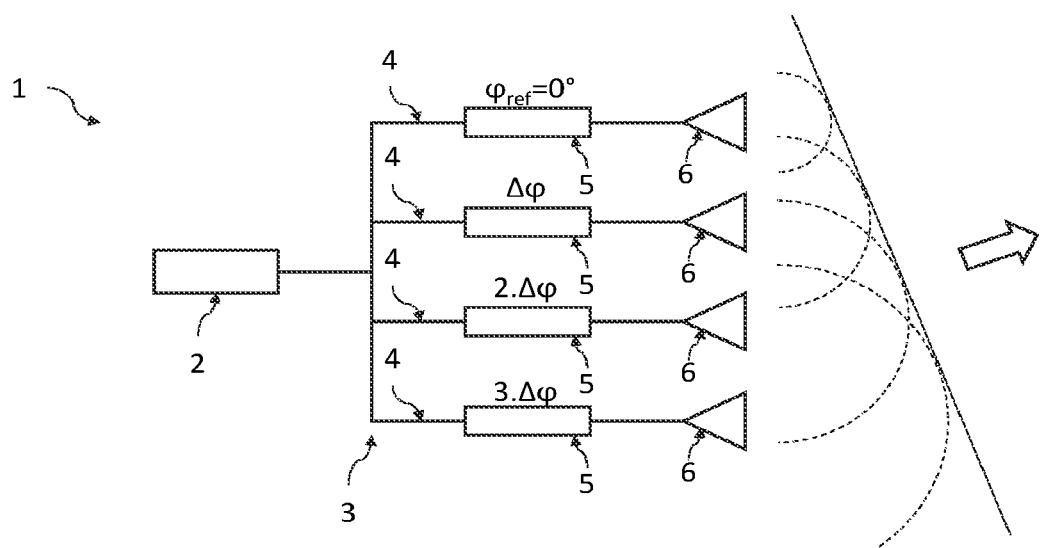
FIG. 1A, already described, is a schematic and partial view of an optoelectronic emitter with a phased array antenna.
Figure 1B:
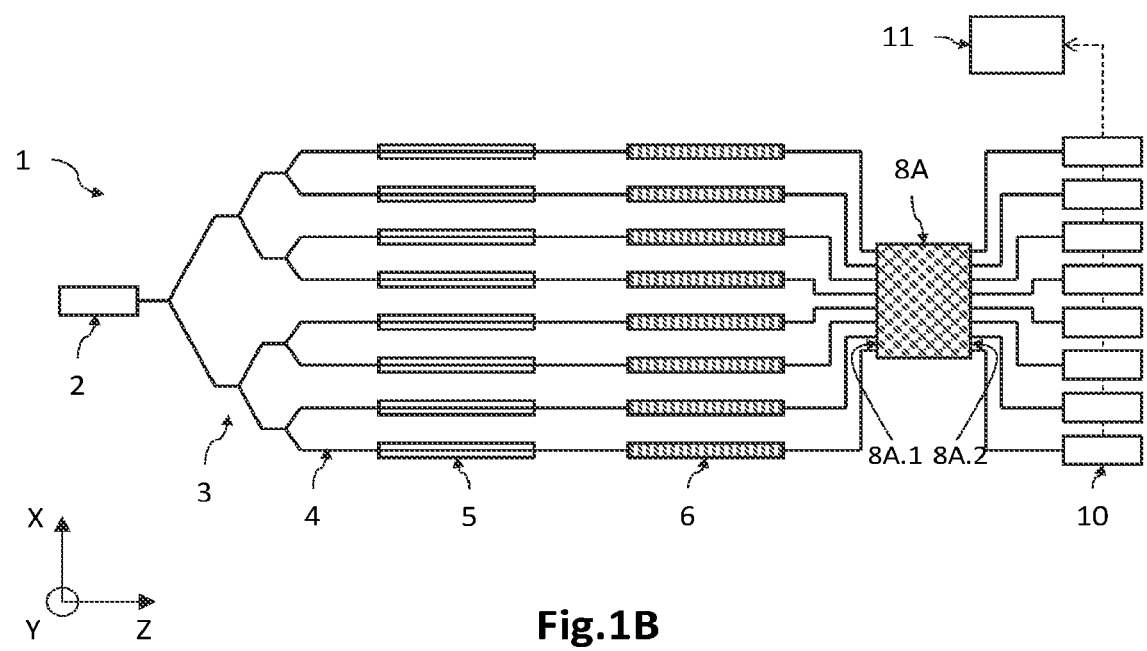
FIG. 1B, already described, is a schematic and partial top view of such an optoelectronic emitter, comprising an integrated control device, according to an example of the prior art.
Figure 2:
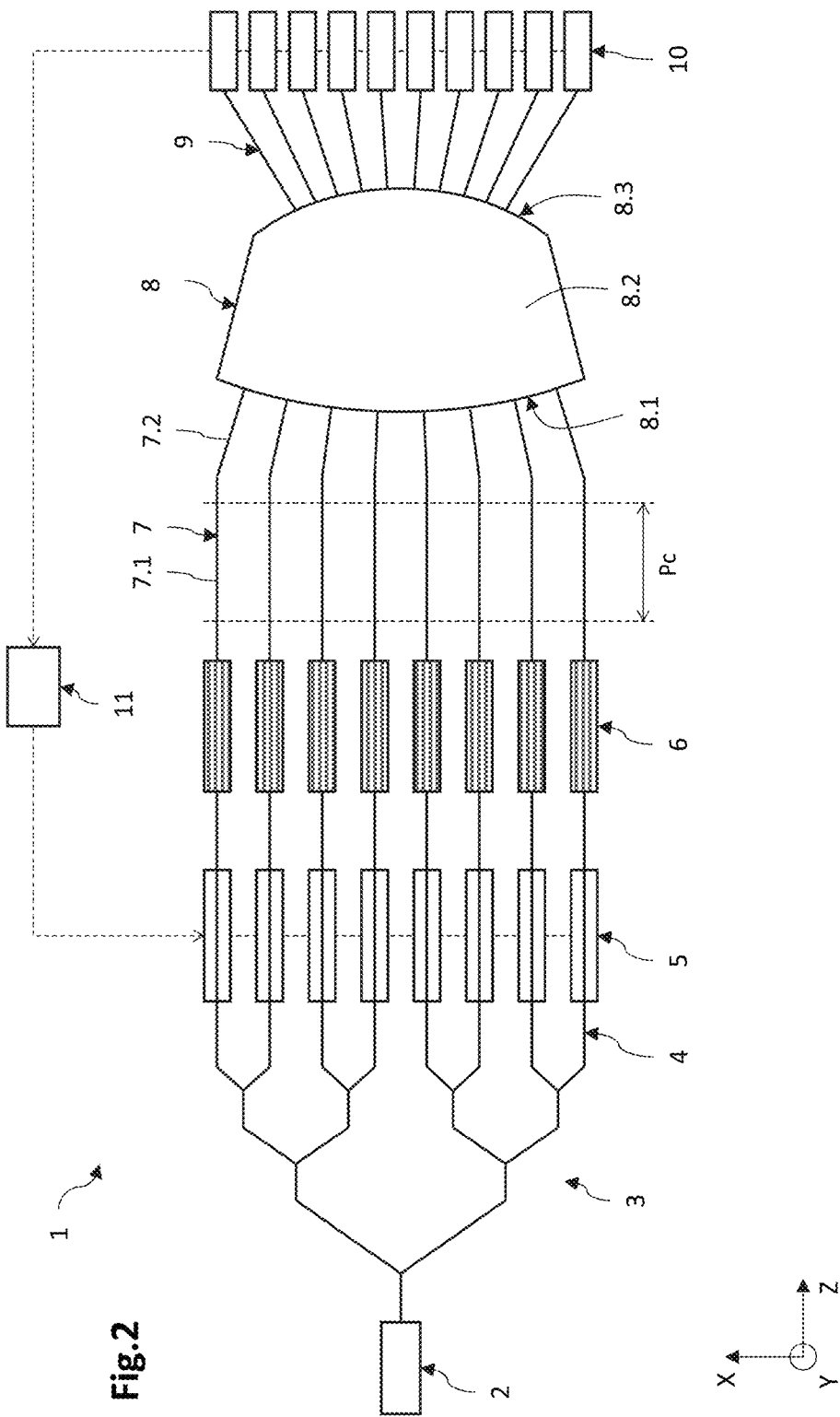
FIG. 2 is a schematic and partial top view of an optoelectronic emitter with a phased array antenna according to one embodiment, in which the interferometric lens is a star coupler.

FIG. 2 is a schematic and partial view of an optoelectronic emitter 1 according to one embodiment. In this example, the optoelectronic emitter 1 comprises a laser source 2, a power splitter 3, an array of phase shifters 5 and elementary emitters 6. It also comprises a control device, connected to the phase shifters 5, allowing the phase shift $\Delta\varphi$ applied to the optical signals circulating in the N arms 4 to be determined or even modified, in order to thus improve the performance capabilities of the optoelectronic emitter 1, and in particular to generate the desired emission pattern of the far field light beam emitted by the optoelectronic emitter 1.

In this case, and throughout the remainder of the description, a direct orthonormal XYZ coordinate system is defined, where the XZ plane is parallel to the plane of the photonic chip, and the Z-axis is oriented along the axis of the elementary emitters 6, with the Y-axis thus being oriented toward the free space in which the light beam is emitted by the optoelectronic emitter 1.

The optoelectronic emitter 1 is integrated on a photonic chip, for example, within the context of photonic-on-silicon technology. The photonic chip, also called Photonic integrated Circuit (PIC), comprises a support substrate (not shown), from which active (modulators, diodes, etc.) and passive (waveguides, multiplexers or demultiplexers, etc.) photonic components can be produced that are optically coupled to one another. Within the context of photonic-on-silicon technology, the support substrate and the photonic components are produced from silicon. The support substrate thus can be of the SOI (Silicon On Insulator) type.

The optoelectronic emitter 1 comprises a laser source 2 adapted to emit a pulsed or continuous monochromatic optical signal of wavelength $\lambda_c$. The wavelength can be, by way of example, equal to 905 nm. The laser source 2 can be wavelength tunable, in particular to modify the emission angle θ that the far field light beam emitted by the optoelectronic emitter forms with respect to the Y-axis in the YZ plane. The laser source 2 can be a hybrid source formed by a gain medium produced from a III/V compound and adhered to the surface of the photonic chip. Thus, Bragg mirror type optical reflectors can be produced in a waveguide integrated in and coupled to the gain medium. As an alternative embodiment, the optoelectronic emitter 1 may not comprise the laser source 2, which can be remote and thus not assembled in contact with the surface of the photonic chip. It then can be coupled to an integrated waveguide of the photonic chip, in particular by a grating coupler.

A power splitter 3 is coupled to the output of the laser source 2. It thus comprises an input port and N output ports, with N>1. The number N defines the number of arms 4 of the optoelectronic emitter 1. In this example, the power splitter 3 is formed by a plurality of MMI (Multimode Interferometer) type splitters arranged in a cascade like manner, but other types of optical components can be used.

The optoelectronic emitter 1 comprises an array of N waveguides 4, preferably parallel to each other, each extending between a first end coupled to an output port of the power splitter 3 and a second end coupled to an elementary emitter 6. Each waveguide 4 is therefore adapted to receive an optical signal originating from the power splitter 3, and to allow this optical signal to propagate to an elementary emitter 6.

The optoelectronic emitter 1 also comprises an array of phase shifters 5 and elementary emitters 6. More specifically, a plurality of arms 4 is equipped with at least one phase shifter 5 adapted to modify the phase of the optical signal circulating in the relevant arm, and thus generate a phase difference $\Delta\varphi$, or relative phase, between the optical signals circulating in the adjacent arms 4. The phase shifters 5 are disposed between the power splitter 3 and the elementary emitters 6. Each arm 4, or only some of the arms, for example, one arm in two, can be equipped with a phase shifter 5. Furthermore, the reference arm may not comprise phase shifters 5.

The phase shifters 5 can be electro-refractive or thermo-optic effect phase shifters. In both cases, the phase is modified by modifying the refractive index of the material forming the core of the considered waveguide 4. This modification of the refractive index can be obtained by modifying the free carrier density in the case of the electro-refractive phase shifter, or by modifying the applied temperature in the case of the thermo-optic phase shifter.

The phase shifters 5 are preferably adapted to apply the same phase value $\Delta\varphi$ relative to the optical signals propagating in the arms 4, so as to obtain a determined non-zero angle $\Phi$ of the main emission axis with respect to the Y-axis in the XY plane (orthogonal to the axis of the elementary emitters 6). However, the relative phase $\Delta\varphi$ may not be identical between the arms 4, either for obtaining a different far field pattern, or for taking into account and compensating for any phase errors. These phase errors can originate from the degradation over time of some of the components of the optoelectronic emitter 1, inconsistencies during the manufacturing method, non-zero tolerances of the manufacturing method, the impact of the environment of the optoelectronic emitter 1 (for example, the possible effect of packaging elements covering the elementary emitters).

The phase shifters 5 are preferably connected to the control module 11 described hereafter. Depending on the control signals that are sent by the control module 11, the phase shifters 5 can generate a predetermined relative phase $\Delta\varphi$ in the optical signals circulating in the various arms 4.

The optoelectronic emitter 1 comprises N elementary emitters 6, or optical antennas, coupled to the arms 4, and therefore disposed downstream of the phase shifters 5. The relative phase $\Delta\varphi$ between the optical signals emitted by the elementary emitters 6 particularly determines the value of the angle $\Phi$ formed by the main emission axis of the far field light beam with respect to the Y-axis in the XY plane of the optoelectronic emitter 1.

The elementary emitters 6 in this case are diffraction gratings formed in waveguides of the arms 4. They extend along the Z-axis parallel to each other and are aligned along the X-axis, i.e., their first ends have the same position along the Z-axis, like their second ends. They are spaced apart from each other by a distance preferably ranging between $N_e/2$ and $2\lambda_e$. For information purposes, the number N of elementary emitters can range from around ten to around ten thousand.

Thus, the optical signals circulating in the arms 4 are partly emitted by the elementary emitters 6 in free space by diffraction. The extracted optical signals propagate in free space, recombine by interference, and thus form the light beam emitted by the optoelectronic emitter 1 in the far field, the angular distribution of the light beam around the main emission axis is determined and defines the far field emission pattern of the optoelectronic emitter 1.

The angle $\theta$ formed by the main emission axis with respect to the Y-axis in the YZ plane depends, in a known manner, on the emission wavelength $\lambda_e$ of the laser source 2 and on the period $\Lambda$ of the diffraction grating formed by the elementary emitters 6. As indicated above, the angle $\Phi$ formed by the main emission axis with respect to the Y-axis in the XY plane depends on the value of the relative phase $\Delta\varphi$ applied by the phase shifters 5 to the optical signals circulating in the arms 4. It is generally required that a zero relative phase $\Delta\varphi$ results in a zero angle $\Phi$, i.e., that the main emission axis of the far field light beam is parallel to the Y-axis.

Moreover, the elementary emitters in this case have an extraction efficiency of less than 100%, which means that the intensity $I_{out}$ of the optical signal (guided mode) output from the elementary emitters 6 along the Z-axis is non-zero. To this end, the length L of the elementary emitters is adjusted so that the intensity $I_{out}$ of the guided mode at the second end of the elementary emitters 6 has a predefined non-zero value. As an alternative embodiment or in addition, the non-zero intensity $I_{out}$ can be obtained by adjusting the etching depth of the teeth of the grating forming the elementary emitter, and/or by adjusting the filling factor of the grating, i.e., the ratio of the length of a tooth to the length of a recess, over a period (formed by a tooth and a recess) of the elementary emitter.

However, the value $\Delta\varphi$ of the relative phase applied by the phase shifters 5 may need to be controlled or corrected. As mentioned above, this can be the case for calibrating the optoelectronic emitter 1, for example, so that a zero relative phase $\Delta\varphi$ actually results in a zero angle $\Phi$ of the main emission axis, i.e., an orientation parallel to the Y-axis in the XY plane. This also can be the case for compensating for any phase errors resulting from the method for manufacturing or aging some components of the optoelectronic emitter. This finally can be the case for modifying the value of the angle t precisely and in real time, such that the far field emission pattern has the desired features.

To this end, the optoelectronic emitter 1 comprises a control device formed by an interferometric focusing lens 8, a plurality of photodetectors 10 and a control module 11. The control device also comprises N input waveguides 7, which provide the coupling between the elementary emitters 6 and the interferometric lens 8, as well as output waveguides 9, which provide the coupling between the interferometric lens 8 and the photodetectors 10. The control device is said to be integrated to the extent that the waveguides 7, 9, the interferometric lens 8 and the photodetectors 10 are produced on or from the control chip.

The N input waveguides 7 connect the second end of the elementary emitters 6 to the entrance face 8.1 of the interferometric lens 8. They have identical optical paths from one input waveguide 7 to the next, so as not to degrade the phase information ($\Delta\varphi$ value) carried by the optical signals transmitted (not diffracted) by the elementary emitters 6.

As described in further detail hereafter, they each have at least two parts, namely: a first part 7.1, in which the input waveguides 7 extend parallel to each other from the elementary emitters 6, and a second part 7.2, in which the input waveguides 7 extend up to the entrance face 8.1 of the interferometric lens 8.

In the first part 7.1, the input waveguides 7 can have the same length. In the second part 7.2, they are connected to the entrance face 8.1 orthogonal thereto, i.e., each input waveguide 7 is connected to an input port of the entrance face 8.1, orthogonal to a plane tangent thereto.

However, since the entrance face 8.1 of the interferometric lens 8 is curved in the XZ plane, the lengths of the input waveguides 7 therefore are not identical from one input waveguide 7 to the next. The length $L_e$ in this case corresponds to the distance between a first end of an input waveguide connected to an elementary emitter 6 and a second end opposite the first end and connected to the entrance face 8.1 of the interferometric lens 8.

The focusing interferometric lens 8 relates to the Fourier optic, and thus provides, on its exit face 8.1, a Fourier transform of the optical field supplied to the entrance face 8.1 by the input waveguides 7, and formed by the optical signals transmitted by the elementary emitters 6. The exit face 8.3 forms the image plane of the interferometric lens 8, such that the diffraction pattern formed on the exit face 8.3 is correlated with the far field emission pattern of the light beam emitted by the optoelectronic emitter 1.

To this end, the interferometric lens 8 is defined by the entrance face 8.1, the exit face 8.3, and a Free Propagation Region (FPR) 8.2 located between the two faces 8.1, 8.3. The entrance 8.1 and exit 8.3 faces are curved, with the radius of curvature of each being located on the optical axis $\Delta$ of the interferometric lens 8 (in this case parallel to the Z-axis). The interferometric lens 8 is planar since it extends in the XZ plane of the photonic chip. In the FPR 8.2, the optical field is contained along the Y-axis orthogonal to the XZ plane of the photonic chip, but it can freely propagate in the XZ plane. The FPR 8.2 is defined by a homogeneous refractive index medium in the XZ plane, unlike the GRIN lens described in the previously mentioned article by Hulme et al., 2015. In other words, the FPR 8.2 has a refractive index that is identical at any point in this region 8.2, and preferably over its entire thickness, which is then constant over the entire region 8.2.

Such an interferometric lens 8 is also called star coupler. It focuses the optical signals received at the entrance face 8.1 on the exit face 8.3. The optical signals propagate in the FPR 8.2, constructively interfere, and converge toward a zone or a point of the focal line defined by the exit face 8.3 (image plane). The spatial distribution of the intensity of the optical field on the exit face 8.3 is therefore correlated with the far field emission pattern of the optoelectronic emitter 1. Thus, the features of the far field emission pattern are found on the exit face 8.3, and the angle $\Phi$ can be deduced therefrom that is formed in the far field by the light beam of the optoelectronic emitter with respect to the Y-axis and in the XY plane.

The control device comprises M photodetectors 10, coupled to the exit face 8.3 by M output waveguides 9. The number M can be equal to or different from the number N. It defines, with the radius of the lens, the resolution of the control device as well as the observation angular width of the far field light beam. However, the resolution of the control device is not limited by the size of the ports of the exit face. Indeed, if the beam is located between two ports, its position can be accurately extracted by computing the ratio of the intensities of the photodiodes connected to the two adjacent ports. The output waveguides 9 thus extend between ports of the exit face 8.3 to inputs of the photodetectors 10. The output ports are therefore located along the focal line of the interferometric lens 8.

The control module 11 is connected to the photodetectors 10 and, advantageously, to the phase shifters 5. The photodetectors and the phase shifters are controlled from the measurement signals transmitted by the photodetectors 10. The photodetectors 10 therefore receive optical signals exiting the ports of the exit face 8.3, and transmit measurement signals to the control module 11 that represent the optical intensity of the optical field received on the exit face 8.3. The control module 11 comprises a computer, which, on the basis of the measurement signals, can determine the actual phase shift value $\Delta\varphi$ between the optical signals circulating in the arms 4, as well as a phase shift value $\Delta\varphi$ to be applied to the optical signals by means of the phase shifters 5 in order to particularly correct any phase errors.

It is then possible to calibrate the optoelectronic emitter 1, for example, by applying a zero relative phase $\Delta\varphi$ and by determining the angle $\theta_{cr}$ of the peak of intensity of the optical field received on the exit face 8.3 of the interferometric lens 8. The angle $\theta_{cr}$ is defined as the angle of incline between the optical axis $\Delta$ of the interferometric lens 8 and a straight line passing through the peak intensity on the exit face 8.3 and by an entrance point Pe of the interferometric lens 8. A compensation value of the relative phase $\Delta\varphi$ thus can be determined if it has been determined that a zero relative phase $\Delta\varphi$ induces a non-zero angle $\theta_{cr}$. It is also possible to control the optoelectronic emitter 1 precisely and in real time, by inducing a predefined relative phase $\Delta\varphi$, and by determining the induced angle $\theta_{cr}$ (and vice versa). Thus, having to use an external device for detecting and measuring the far field light beam emitted by the optoelectronic emitter is avoided, with such an external device comprising a matrix photodetector located opposite the elementary emitters along the Y-axis. Moreover, the fact that the interferometric lens 8 is a lens with an FPR 8.2 with a homogeneous refractive index prevents the manufacturing uncertainties of this lens from significantly affecting the performance capabilities of the optoelectronic emitter 1.

Figure 3A:
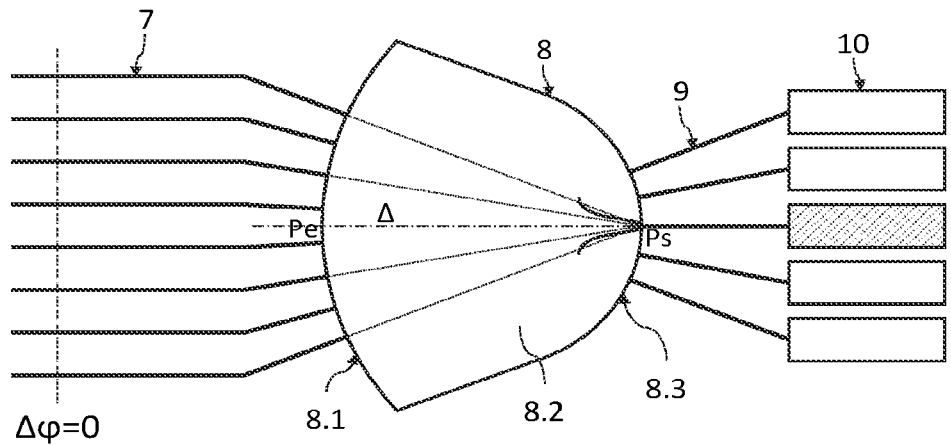
FIGS. 3A to 3C are schematic and partial top views of part of the optoelectronic emitter illustrated in FIG. 2, illustrating the focusing of the optical field in three different zones of the exit face of the interferometric lens.
Figure 3B:
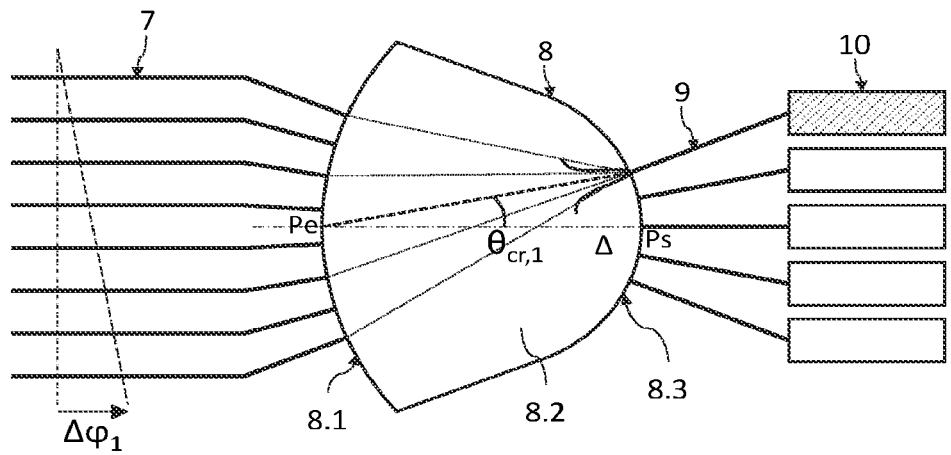
Figure 3C:
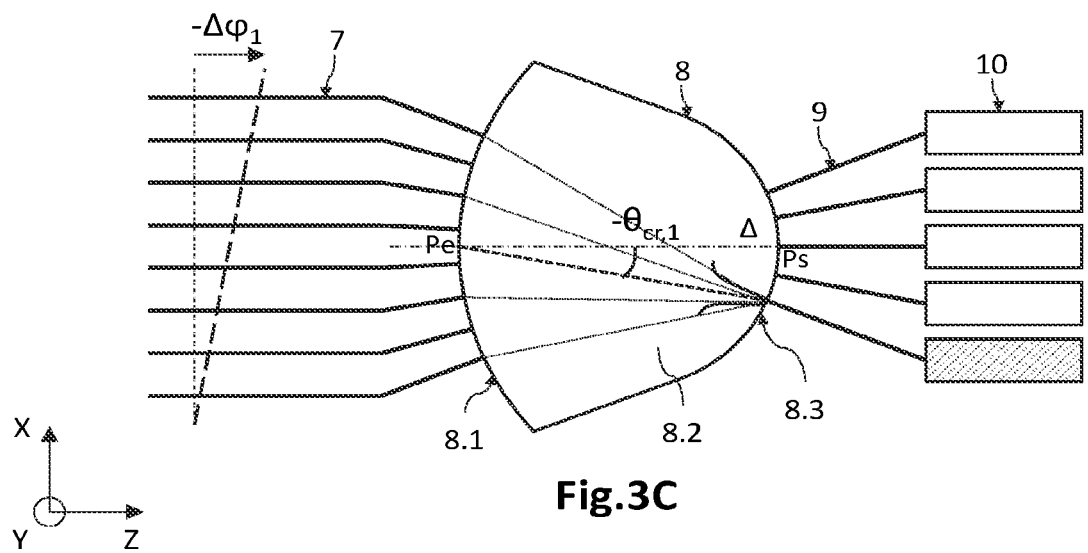

To this end, FIGS. 3A to 3C are schematic and partial top views of the interferometric lens 8 and of the photodetectors 10. In this case, a zero relative phase $\Delta\varphi$ corresponds to a zero angle $\Phi$ of the main emission axis, with the peak intensity of the optical field on the exit face being aligned with the optical axis $\Delta$ of the interferometric lens 8 (FIG. 3A). However, when the relative phase $\Delta\varphi$ has a non-zero value $\Delta\varphi_1$, and induces a non-zero angle $\Phi_1$ of the main emission axis, the peak intensity on the exit face forms a non-zero angle $\theta_{cr,1}$ (FIG. 3B). Finally, when the relative phase $\Delta\varphi$ has a non-zero value $-\Delta\varphi_1$, and induces a non-zero angle $-\Phi_1$ of the main emission axis, the peak intensity on the exit face forms a non-zero angle $-\theta_{cr,1}$ (FIG. 3C).

The interferometric lens 8 can have a Rowland mounting or a confocal configuration. These two alternative embodiments basically differ from each other in terms of the value of the radius of curvature of the circle defining the exit face 8.3. As described hereafter, it can be a star coupler, or an echelle grating, which is a particular case of the star coupler.

Figure 4A:
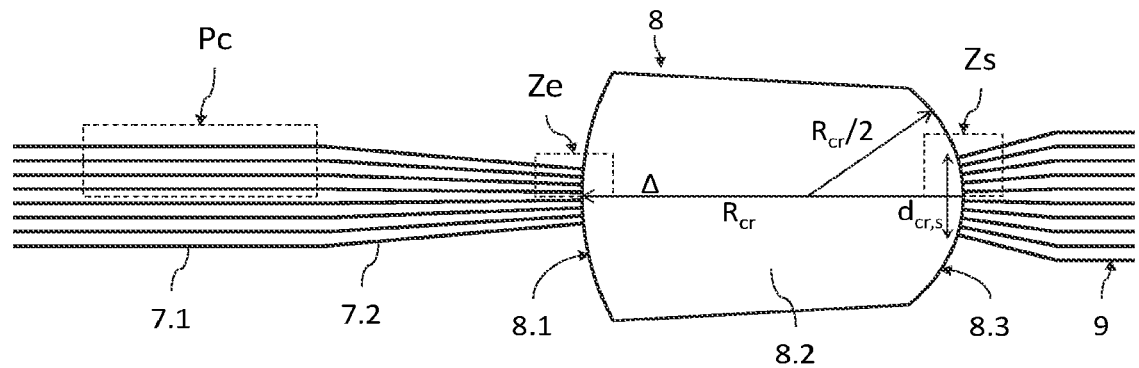
FIG. 4A is a schematic and partial top view of part of the optoelectronic emitter illustrated in FIG. 2, illustrating the sizing of the interferometric lens in a Rowland mounting.
Figure 4B:
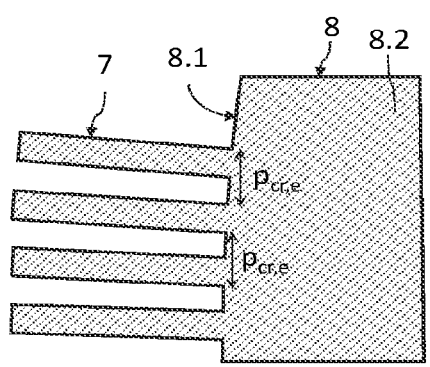
FIGS. 4B and 4C are detailed views of a zone of the entrance face (FIG. 4B) and of a zone of the exit face (FIG. 4C) of the interferometric lens illustrated in FIG. 4A.
Figure 4C:
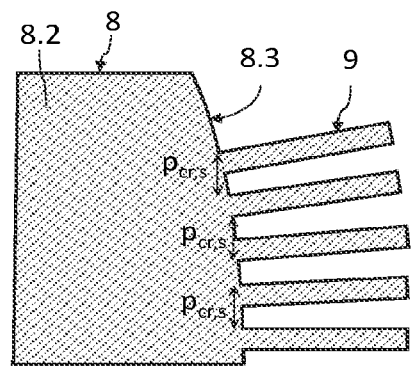

FIG. 4A is a schematic and partial top view of part of the optoelectronic emitter according to one embodiment, in which the focusing interferometric lens has a Rowland mounting. FIGS. 4B and 4C are schematic and partial top views, respectively of the zone Ze of the entrance face 8.1, and of the zone Zs of the exit face 8.3 of the interferometric lens 8.

In the Rowland mounting, the entrance face 8.1 is curved with a radius of curvature denoted $R_{cr}$, and the exit face 8.3 is curved with a radius of curvature $R_{cr}/2$. The sizing of the interferometric lens 8 particularly depends on the desired detection resolution of the optical field focused on the exit face 8.3, and on the maximum angular detection aperture defined by the angle $2 \times \theta_{cr,max}$ around the optical axis $\Delta$.

More specifically, the optical axis $\Delta$ of the interferometric lens 8 in this case extends along the Z-axis between the entrance point Pe of the entrance face 8.1, and an exit point Ps of the exit face Ps. The center of the Rowland circle of radius $R_{cr}$ is located at the exit point Ps, and an arc of the Rowland circle of radius $R_{cr}$ defines the entrance face 8.1. An arc of a circle of radius $R_{cr}/2$ defines the exit face 8.3, the center of which is located on the optical axis $\Delta$.

Thus, the angle $\Phi$ of the far field light beam depends on the relative phase $\Delta\varphi$ by the following relation: $\Delta\varphi = p_{ee}/\lambda_e \times \sin \Phi$, where $p_{ee}$ is the lateral step between the elementary emitters 6 along the X-axis (generally ranging between $\lambda_e/2$ and $2\lambda_{ej}$). By way of example, the emission wavelength $\lambda_e$ can be equal to 0.905 µm, and the lateral step $p_{ee}$ can be equal to approximately 1.6 µm.

The deflection angle $\theta_{cr}$ formed by the peak intensity of the optical field focused on the exit face 8.3 depends on the far field angle $\Phi$ by the following relation: $\sin \theta_{cr} = p_{ee}/(\lambda_{ec} \times p_{cr,e} \times \beta_{FPR}) \times \sin \Phi$, where $p_{ee}$ is the lateral step between the ports of the entrance face 8.1, and $\beta_{FPR}$ is the propagation constant in the FPR 8.2. This relation can be deduced from the article by Smit & van Dam entitled *PHASAR-Based WDM-Devices: Principles, Design and Applications*, IEEE J Sel. Top. Quantum Electron, 2 (2), 236-250 (1996). By way of example, the lateral step $p_{cr,e}$ can be equal to approximately 1.2 µm (in this case for N=16), and the constant $\beta_{FPR}$ can be equal to approximately 12.31 µm$^{-1}$. The propagation constant $\beta_{FPR}$ is equal to $2\pi \times n_{eff,FPR}/\lambda_e$, where $n_{eff,FPR}$ is the effective index of the optical mode in the FPR. It can be determined by a finite element type simulation.

Generally, the effective index $n_{eff}$ associated with an optical mode supported by a waveguide is defined as the product of the propagation constant $\beta$ and of $\lambda/2\pi$. The propagation constant $\beta$ depends on the wavelength $\lambda$ of the optical mode, as well as on the properties of the waveguide (refractive index and transverse dimensions). The effective index of the optical mode in some way corresponds to the refractive index of the waveguide 'seen' by the optical mode. It is commonly included between the index of the core and the index of the cladding of the waveguide.

It is then possible to define an exit lateral dimension $d_{cr,s}$, along which the output ports with a lateral step $p_{cr,s}$ extend along the X-axis. It depends on the maximum angle $\Phi_{max}$ that is intended to be detected, as well as on the radius $R_{cr}$. It is defined by the following relation: $d_{cr,s} = (2 \times R_{cr} \times p_{ee})/(\lambda_e \times p_{cr,e} \times \beta_{FPR}) \times \sin \Phi_{max}$. Thus, by way of an example, for a radius $R_{cr}$ equal to approximately 310 µm, and a maximum angle $\Phi_{max}$ equal to approximately 30°, an exit lateral dimension $d_{cr,s}$ equal to approximately 37 µm is obtained. In this case, it is possible to have 25 output ports arranged with a lateral step $p_{cr,s}$ equal to approximately 1.5 µm.

Furthermore, the selection of the radius $R_{cr}$ depends on the desired resolution (value of $p_{cr,s}$) and on the desired maximum angular detection aperture $2 \times \theta_{cr,max}$. This thus avoids having to produce a gradient-index lens (GRIN lens), as in the aforementioned example of the prior art, which can be technically difficult to obtain and the manufacturing tolerance of which can result in a degradation in the performance capabilities of the optoelectronic emitter 1. On the contrary, the fact that the interferometric lens 8 is formed by two curved faces 8.1, 8.3 defining the FPR 8.2 with a homogeneous refractive index allows the manufacturing method to be simplified while limiting the impact of the manufacturing tolerances on the performance capabilities of the optoelectronic emitter 1.

However, the input waveguides 7 are locally connected to the entrance face 8.1, orthogonal thereto, i.e., each input waveguide 7 emerges on the FPR 8.2 at the entrance face 8.1 while being oriented toward the exit point Ps of the interferometric lens 8 (center of the circle of radius $R_{cr}$). As a result, the input waveguides 7 do not have an identical physical length $L_e$ from one guide 7 to the next. $L_{e(i)}$ denotes the physical length of an input waveguide 7 of row i, with i ranging from 1 to N, with the rows 1 and N being located at the edge of the array of input waveguides 7.

The input waveguides 7 then have a correction portion Pc of the effective index of the guided mode such that the optical paths are identical from one input waveguide to the next. In general, the optical path of a waveguide is equal to the product of its length (physical) with the effective index of the guided mode. This correction portion Pc is preferably located in the first part 7.1 of the input waveguides 7. $n_{eff,ec(i)}$ denotes the effective index of the input waveguide 7 in the correction portion Pc, and $n_{eff,eO(i)}$ denotes the effective index of the input waveguide 7 outside the correction portion Pc. The optical path $C_{(i)} = n_{eff,ec(i)} \times L_{ec} + n_{eff,eO(i)} \times (L_e - L_{ec})$ that is required to be constant from one input waveguide 7 to the next is also obtained.

Several possibilities can be implemented to make the optical paths $C_{(i)}$ of the input waveguides 7 identical. A first possibility (illustrated in FIG. 5) involves modifying the lateral dimensions of the input waveguides over a length $L_{ec(i)}$ in the correction portion Pc, so as to correct the effective index of the guided mode in each of the input waveguides. A second possibility (illustrated in FIG. 6) involves implementing modal coupling between each input waveguide 7 and an additional waveguide 12 located opposite the Y-axis and having a refractive index different from that of the input waveguide 7, so as to obtain a supermode locally and over a given length. A third possibility (illustrated in FIG. 7) involves actively modulating the effective index of the guided mode in each input waveguide 7, by means of additional thermo-optic phase shifters (heaters) 14.

Figure 5:
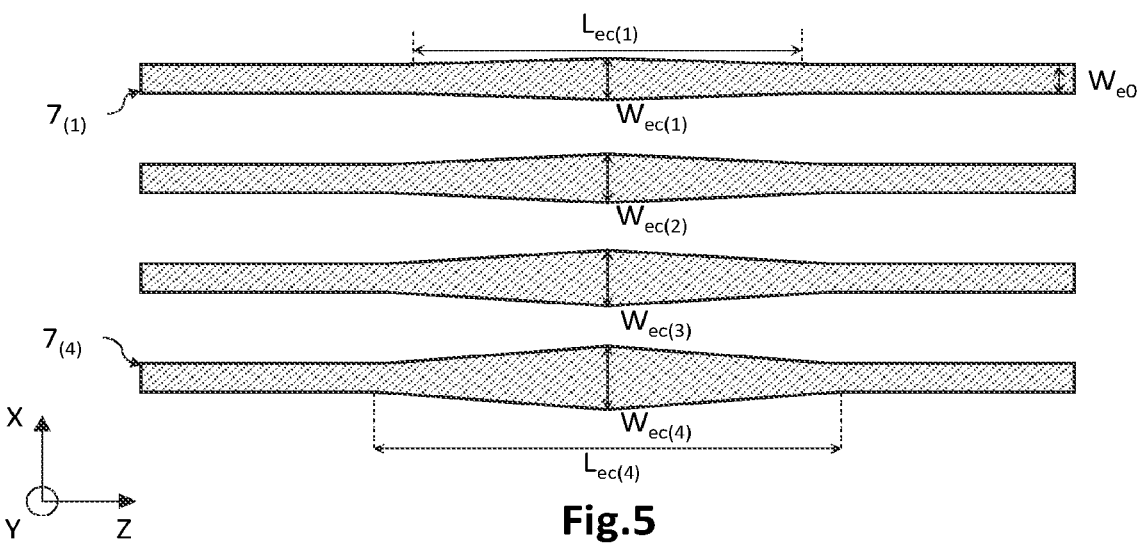
FIG. 5 is a schematic and partial top view of part of the optoelectronic emitter illustrated in FIG. 2, illustrating the longitudinal variation of the width of the input waveguides in the correction portion.

FIG. 5 is a schematic and partial top view of several input waveguides 7 at the correction portion Pc.

Outside the correction portion Pc, the input waveguides 7 have the same transverse dimensions by thickness $e_e$ and by width $W_{e0}$, with this being the case over a length $L_{e(i)} - L_{ec(i)}$, where $L_e$ is the total length of the input waveguide of row i between the downstream end of the elementary emitter 6 and the entrance face 8.1, and where $L_{ec(i)}$ is the length of the correction portion Pc for this same input waveguide. It has previously been indicated that the lengths $L_{e(i)}$ are different from one input waveguide 7 to the next to the extent that the entrance face 8.1 is curved and that these input waveguides 7 orthogonally emerge thereon. Moreover, the length $L_{ec(i)}$ can be identical or different from one input waveguide to the next.

In the correction portion Pc, the input waveguides 7 have a maximum transverse dimension, in this case the width $W_{ec(i)}$, that is different from one input waveguide 7 to the next, such that the optical paths $C_{(i)}$ of the input waveguides 7 are identical over their entire length.

More specifically, the input waveguides 7 have a progressive variation, in this case linear, of the width W, ranging from $W_{e0}$ to $W_{ec(i)}$ and vice versa, over a length. $L_{ec(i)}$. Thus, the input waveguide of row 1 exhibits linear expansion of its width ranging from the value $W_{e0}$ to $W_{ec(1)}$ over a length $L_{ec(1)/2}$, then exhibits linear shrinkage ranging from $W_{ec(1)}$ to $W_{e0}$ over a length $L_{ec(1)/2}$. The length $L_{ec(i)/2}$ is selected such that the variation of the width is adiabatic, i.e., without optical losses. It can be at least equal to approximately 25 µm. The maximum widths $W_{ec(i)}$ are different from one input waveguide 7 to the next, so as to induce a variation of the effective index of the guided mode for each input waveguide with this longitudinal variation of the effective index being determined such that the optical paths $C_{(i)}$ of the input waveguides 7 are identical to each other over their entire length. In other words, the longitudinal variation of the width W is adjusted such that:

$$n_{\it eff}(W_{e0}) \times (L_{e(i)} - L_{ec(i)}) + \int_0^{L_{ec(i)}} n_{\it eff}(W_{ec(i)}) dL = A$$

where A is a non-zero constant that is identical for all the input waveguides.

By way of example, the input waveguide 7 can he formed by a silicon nitride core with a refractive index equal to 2 for the emission wavelength $\lambda_e$ that equal to 905 nm, and with a constant thickness of 300 nm and a width. $W_{e0}$ of 600 nm. The core is surrounded by a cladding made of a silicon oxide having a refractive index equal to 1.45. In this case, the effective index $n_{\it eff,e0}$ for the basic polarization guided mode $TE_{00}$ is equal to 1.72. However, for a width $W_{ec(i)}$ equal to 1 µm, the effective index $n_{\it eff,ec(i)}$ s equal to 1.78.

Furthermore, the longitudinal variation of the local width $W_e$ of the input waveguides 7 in the correction portion Pc induces a variation of the effective index $n_{\it eff,ec(i)}$ of the guided mode, thus allowing the optical paths $C_{(i)}$ of the input waveguides 7 to be equalized. It limits or separates any degradation of the phase information associated with the guided modes, such that the angular distribution of intensity of the optical field focused on the exit face 8.3 of the interferometric lens 8 is actually correlated with the far field emission pattern of the optoelectronic emitter 1.

This is particularly advantageous to the extent that the lateral step of the input waveguides is generally limited, for example, in this case of the order of 1.5 µm, and particularly depends on the lateral step $p_{ee}$ between the elementary emitters 6 (ranging between $\lambda_e/2$ and $2\lambda_e$). A modification of the length $L_{e(i)}$ for correcting the optical path deviation of the input waveguides 7 is then insufficient.

Figure 6:
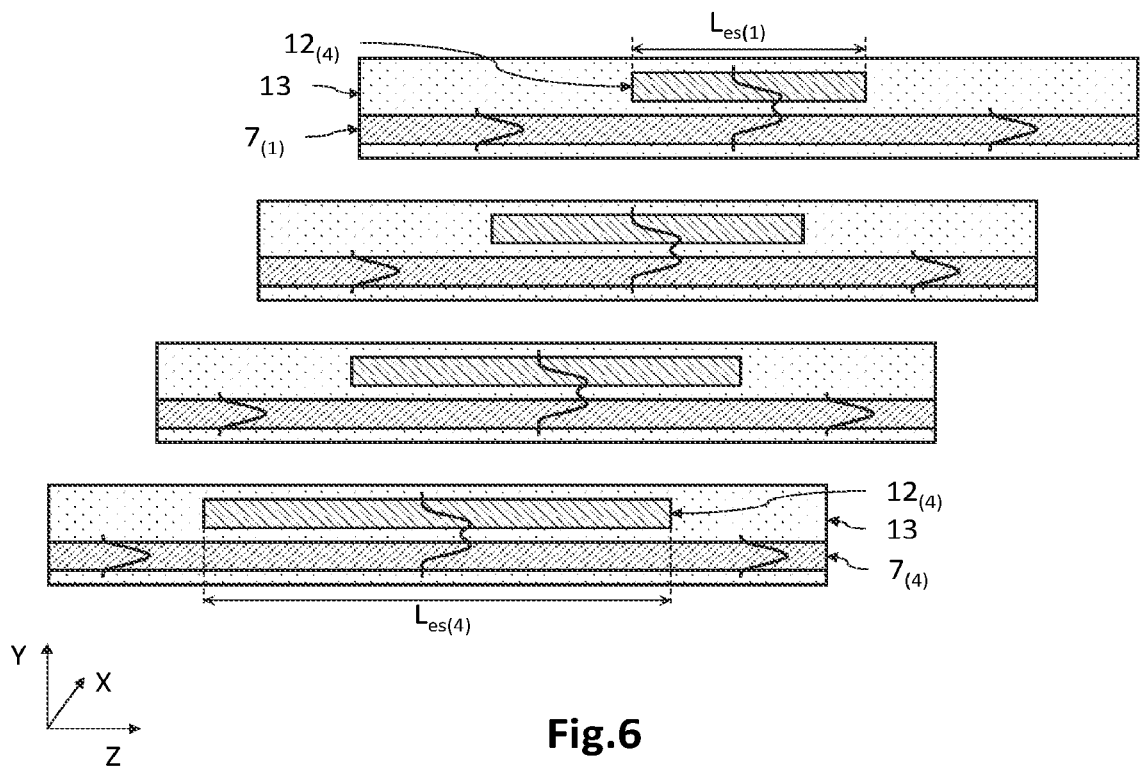
FIG. 6 is a schematic and partial section and exploded view of part of the optoelectronic emitter according to an alternative embodiment, in which additional waveguides are coupled to the input waveguides in the correction portion.

FIG. 6 is a schematic and partial section view of several input waveguides 7 at the correction portion Pc according to an alternative embodiment of the optoelectronic emitter 1. The input waveguides 7 are illustrated as an exploded view.

In this embodiment, additional waveguides 12 are disposed opposite the input waveguides 7 along the Y-axis so as to allow modal coupling between the two waveguides 7, 12. The additional waveguides 12 have a refractive index that is different from that of the input waveguides 7, and is preferably higher than that of the input waveguides. Preferably, the input waveguides 7 have transverse dimensions (thickness and width) that remain constant over their entire length $L_{e(i)}$. Also preferably, the upper waveguides 12 also have transverse dimensions (thickness and width) that remain constant over their entire length. A cladding 13, for example, made of a silicon oxide, surrounds the waveguides 7 and 12.

Modal coupling is understood to mean that the guided mode circulating in the input waveguide 7 spatially extends both into the input waveguide 7 and into the upper waveguide 12, thus forming a supermode. More specifically, the component of the electric field of the supermode has spatial distribution that covers the input waveguide 7 as well as the upper waveguide 12. The modal coupling is provided by suitable vertical spacing of the upper waveguides 12 with respect to the input waveguides 7, that is equal, for example, to a few tens to hundreds of nanometers.

Thus, due to the modal coupling between the two waveguides 7, 12, the guided mode has an effective index that is different in the correction portion Pc (due to the modal coupling) to that outside the correction portion. The difference in length $L_{es(i)}$ between the upper waveguides 12 in the correction portion Pc induces a variation of the effective index of the guided mode for each of the input waveguides 7. Thus, as illustrated in FIG. 6, the length $L_{es(1)}$ of the waveguide 12 associated with the input waveguide 7 of row 1 has a value that is lower than that of $L_{es(2)}$, which is itself lower than $L_{es(3)}$. Thus, the guided mode circulating in the waveguide 7 of row 3 has an optical path equal to that of the waveguide 7 of row 2, and to that of the waveguide 7 of row 1. Thus, the length $L_{es(i)}$ of the guides 12 is predefined for each waveguide 7 such that the optical paths of the waveguides 7 are identical from one guide 7 to the next over their entire length.

Figure 7:
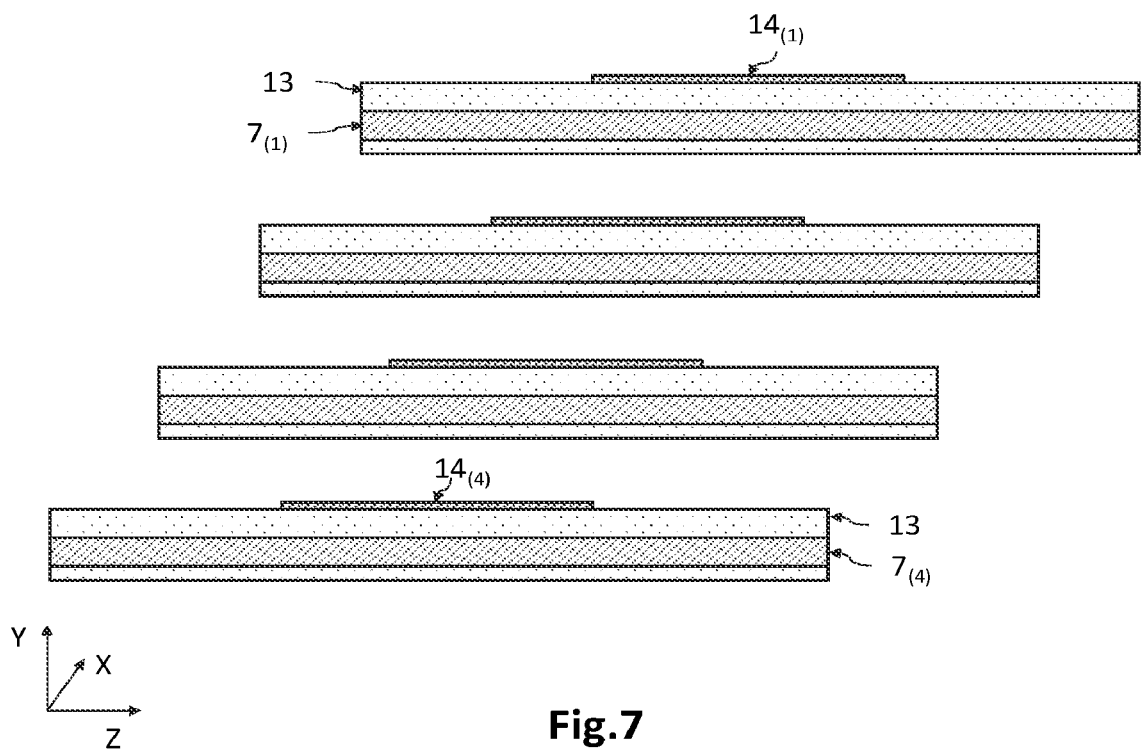
FIG. 7 is a schematic and partial section and exploded view of part of the optoelectronic emitter according to another alternative embodiment, in which thermo-optic phase shifters are disposed at the input waveguides the correction portion.

FIG. 7 is a schematic and partial section view of several input waveguides 7 at the correction portion Pc according to another alternative embodiment of the optoelectronic emitter. The input waveguides 7 are illustrated as an exploded view.

In this case, the variation of the effective index of the guided mode for each of the input waveguides 7 is actively provided by means of several additional phase shifters 14, preferably thermo-optic phase shifters for limiting optical losses, each disposed opposite, along the Y-axis, an input waveguide 7 in the correction portion Pc.

The value of the temperature applied by each additional phase shifter 14 is predetermined as a function of the variation of the effective index to be obtained in each of the input waveguides 7, so as to equalize the optical paths $C_{(i)}$ of the input waveguides 7. Thus, any degradation of the phase information carried by the guided modes in the input waveguides 7 is limited or avoided.

Particular embodiments have been described above. Various alternative embodiments and modifications are possible without departing from the scope of the invention. In particular, the various previously described alternative embodiments are not mutually exclusive, but can be combined.

The interferometric lens 8 can have other types of mounting, for example, a confocal mounting. In this case, the interferometric lens 8 basically differs from that described in FIG. 2 in that the exit face 8.3 is located opposite the entrance face 8.1 and is defined by the same Rowland circle of radius $R_{cr}$.

Figure 8:
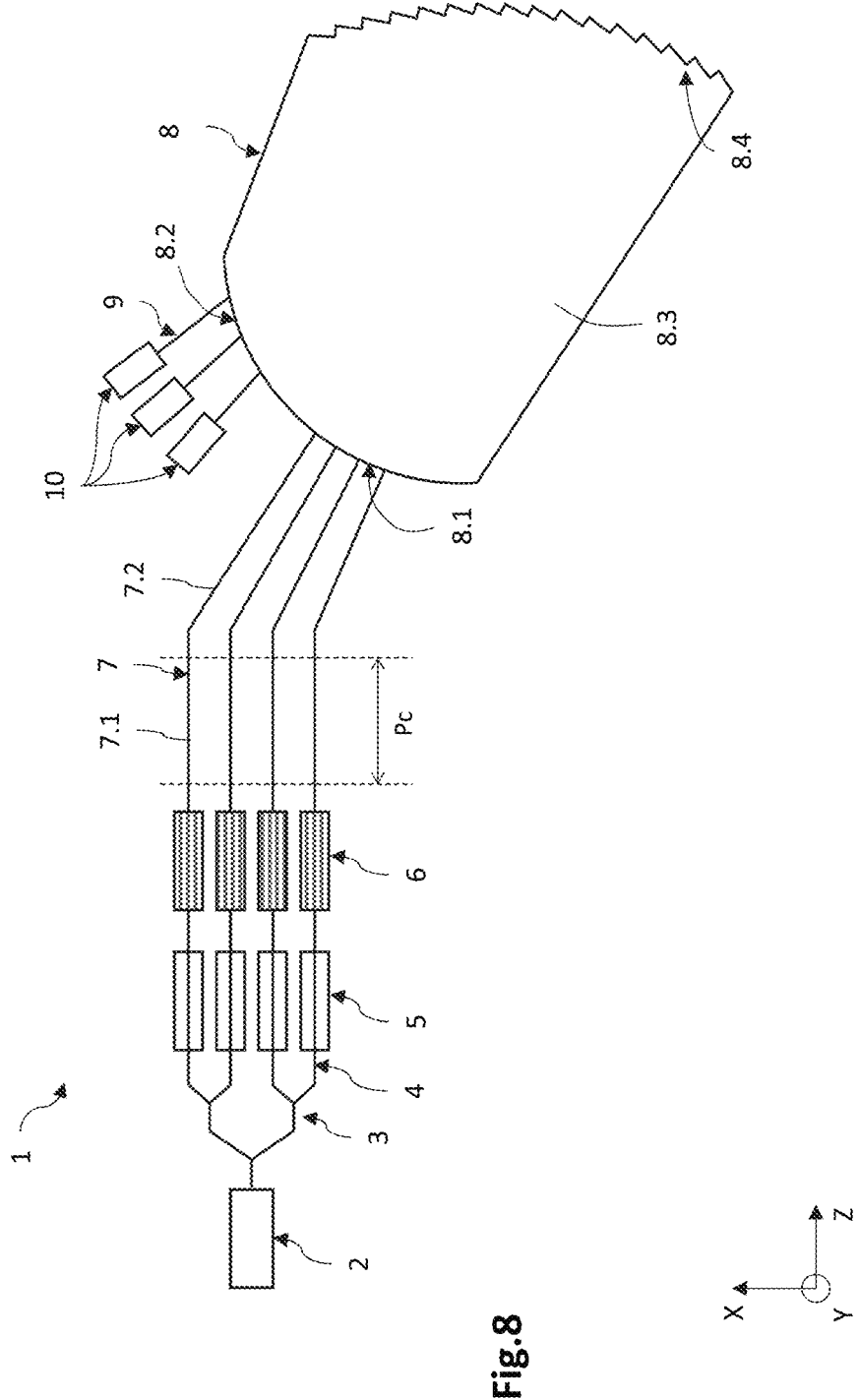
FIG. 8 is a schematic and partial top view of an optoelectronic emitter with a phased array antenna according to another embodiment, in which the interferometric lens is an echelle grating.

FIG. 8 is a schematic and partial top view of an optoelectronic emitter 1 according to another embodiment, in which the interferometric lens 8 is an echelle grating. The entrance face 8.1 and the exit face 8.3 are zones of the same curved face defined by the Rowland circle of radius $R_{cr}$. A reflective face 8.4 opposite the entrance 8.1 and exit 8.3 zones defines therewith the FPR 8.2 with a homogeneous refractive index. The reflective face 8.4 comprises an array of elementary reflectors 8.5 reflecting, toward the focal line defining the exit face 8.3, the optical signals transmitted by the input waveguides 7.

Figure 9A:
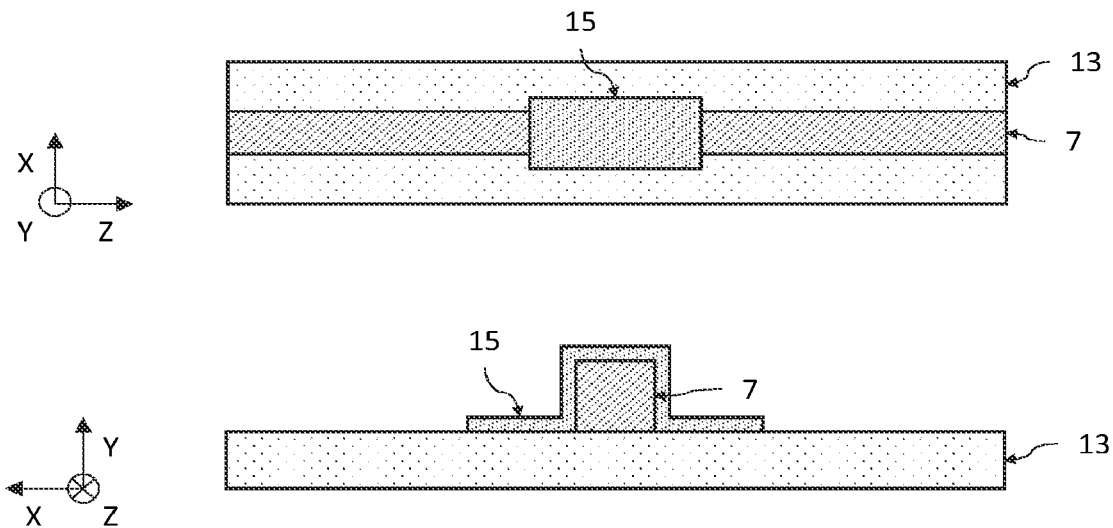
FIGS. 9A and 9B illustrate, as a top and cross-sectional view, part of the optoelectronic emitter according to two other alternative embodiments, in which phase-change portions are disposed at the input waveguides in the correction portion.
Figure 9B:
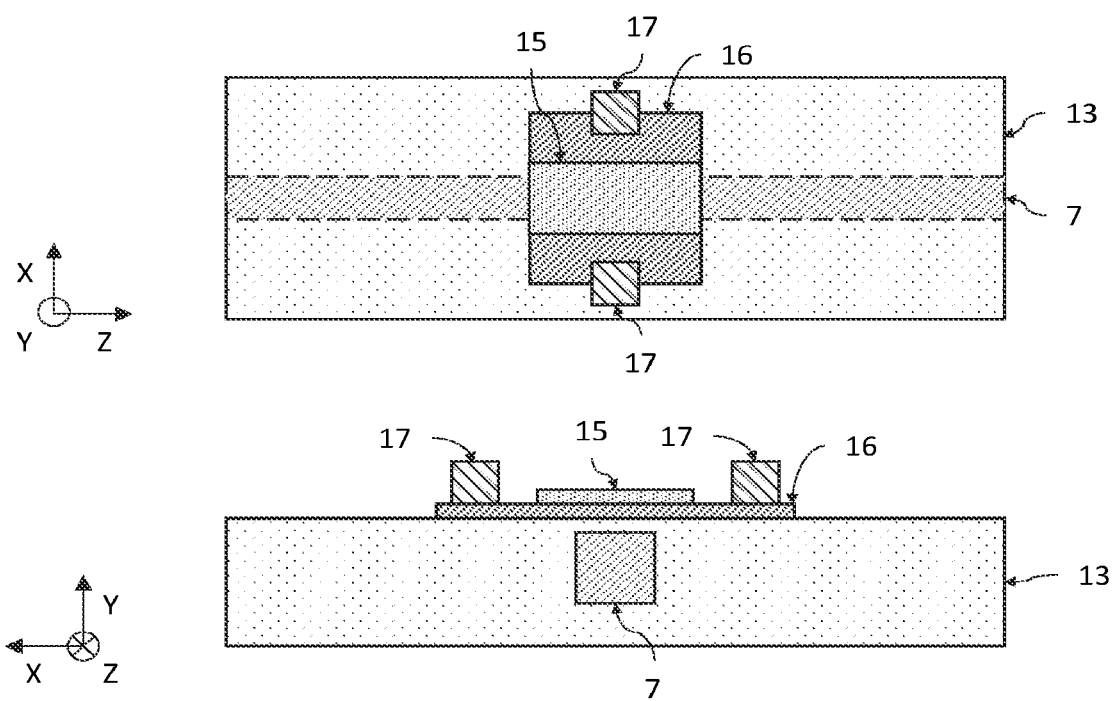

FIGS. 9A and 9B are schematic and partial views of one of the input waveguides 7 at the correction portion Pc according to two other alternative embodiments of the optoelectronic emitter. In this case, the variation of the effective index of the guided mode for each of the input waveguides 7 is provided by means of a phase-change material that is involved in forming the cladding of the waveguide 7. The phase-change material can be particularly selected from chalcogenides, in particular of the GST type, i.e., formed based on germanium Ge, antimony Sb, and tellurium Te. Reference can be made to the document by Abdollahramezani et al., entitled *Tunable nanophotonics enabled by chalcogenide phase-change materials*, Nanophotonics 2020, 9(5), 1189-1241. The portions 15 of phase-change materials statically or dynamically apply a relative phase shift between the guided modes in the input waveguides 7 that is predefined for each of them such that the optical paths of the input waveguides 7 are identical to each other.

FIG. 9A illustrates, as a top and cross-sectional view, a first example, in which the phase-change material has a crystal phase that is predefined during the method for manufacturing the optoelectronic emitter, In this case, the waveguide 7 rests on a substrate 13 involved in forming the cladding. A portion 15 of a thin film phase-change material has been deposited onto and around the waveguide 7, and extends along said waveguide over a length ranging, for example, between 1 µm and 100 µm. In this case, it has an even thickness, for example, ranging between 5 nm and 100 nm. The crystal phase of the phase-change material was defined during the manufacturing method, for example, by means of laser pulses. The effective index of the guided mode therefore depends on the refractive index of the phase-change material (which depends on its crystal phase).

FIG. 9B illustrates, as a top and cross-sectional view, a second example, in which the phase-change material has a crystal phase that can be dynamically (or statically) changed during the operation of the optoelectronic emitter. In this case, the waveguide 7 is embedded in the substrate 13 involved in forming the cladding. A heater 16 is disposed on the surface of the substrate 13, above the waveguide 7 and extends on either side of said waveguide along the X-axis. A portion 15 of phase-change material extends over the heater 16 and above the waveguide 7, over a length ranging, for example, between 1 µm and 100 µm. In this case, it has an even thickness, for example, ranging between 5 nm and 100 nm. Two electrodes 17 are in contact with the heater 16. Thus, applying an electrical voltage between the electrodes causes the heater 16 to heat up, which induces a variation of the crystal phase of the phase-change material. The effective index of the guided mode is then modified accordingly.

The invention claimed is:

1. An optoelectronic emitter (1) with a phased array antenna on a photonic chip, comprising:
    a power splitter configured to be coupled at an input to a laser source and configured to be coupled at an output to N waveguides forming arms of the optoelectronic emitter, with N>1;
    an array of phase shifters and elementary emitters, disposed in the arms, the elementary emitters being laterally aligned and extending parallel to each other; and
    an integrated control device comprising:
        input waveguides coupled to the elementary emitters;
        a focusing lens comprising an entrance face coupled to the input waveguides and an exit face;
        output waveguides coupled to the exit face;
        photodiodes coupled to the output waveguides; and
        a control module configured to control the phase shifters as a function of signals received by the photodiodes;
    the focusing lens being an interferometric lens, the entrance and exit faces of which are curved and define a free propagation region with a homogeneous refractive index, with the exit face extending along a focal line of the focusing lens;
    the input waveguides being connected to the entrance face orthogonal thereto; and
    an effective index for guided modes, in called correction portion of the input waveguides, being configured such that optical paths of the input waveguides are identical to each other.

2. The optoelectronic emitter as claimed in claim 1, wherein the input waveguides each have, in the correction portion, a variation of at least one transverse dimension, with said variation of the at least one transverse dimension being predefined for each input waveguide such that the optical paths of the input waveguides are identical to each other.

3. The optoelectronic emitter as claimed in claim 2, wherein each input waveguide has, in the correction portion, an adiabatic variation of width, ranging from a reference value that is identical for each input waveguide to a maximum value that is different from one input waveguide to a next input waveguide.

4. The optoelectronic emitter as claimed in claim 1, comprising additional waveguides, produced with a refractive index that is different from that of the input waveguides, only extending into the correction portion and arranged opposite and parallel to the input waveguides so as to allow modal coupling with the input waveguides, the additional waveguides each having a predetermined length such that the optical paths of the input waveguides are identical to each other.

5. The optoelectronic emitter as claimed in claim 1, wherein additional phase shifters are coupled to said input waveguides in the correction portion, and apply a relative phase shift between the guided modes in the input waveguides that is predefined for each of input waveguide such that the optical paths of the input waveguides are identical to each other.

6. The optoelectronic emitter as claimed in claim 1, wherein a portion of a phase-change material, located in the correction portion, is associated with each input waveguide and is involved in forming a cladding thereof, the portions of phase-change materials statically or dynamically applying a relative phase shift between the guided modes in the input waveguides that are each predefined such that the optical paths of the input waveguides are identical to each other.

7. The optoelectronic emitter as claimed in claim 1, wherein the focusing lens is a star coupler or an echelle grating.

8. The optoelectronic emitter as claimed in claim 1, wherein the focusing lens has a Rowland mounting or a confocal configuration.

9. The optoelectronic emitter as claimed in claim 1, wherein the photonic chip is produced from an SOI substrate.

10. The optoelectronic emitter as claimed in claim 1, comprising the laser source.

* * * * *